US008639937B2

(12) United States Patent
Bagga et al.

(10) Patent No.: US 8,639,937 B2
(45) Date of Patent: *Jan. 28, 2014

(54) METHOD AND APPARATUS FOR EXTRACTING AUTHENTICATION INFORMATION FROM A USER

(75) Inventors: Amit Bagga, Green Brook, NJ (US); Jon Bentley, New Providence, NJ (US); Lawrence O'Gorman, Madison, NJ (US)

(73) Assignee: Avaya Inc., Basking Ridge, NJ (US)

( * ) Notice: Subject to any disclaimer, the term of this patent is extended or adjusted under 35 U.S.C. 154(b) by 2461 days.

This patent is subject to a terminal disclaimer.

(21) Appl. No.: 10/723,416

(22) Filed: Nov. 26, 2003

(65) Prior Publication Data

US 2005/0114679 A1 May 26, 2005

(51) Int. Cl.
*G06F 21/00* (2006.01)
(52) U.S. Cl.
USPC ............................. 713/184; 707/758; 707/767
(58) Field of Classification Search
USPC .................... 726/2, 4–7, 17–19, 26–30, 1; 713/182–186; 707/100, 1–5, 609, 705, 707/723, 758, 767
See application file for complete search history.

(56) References Cited

U.S. PATENT DOCUMENTS

| | | | |
|---|---|---|---|
| 4,802,217 A | | 1/1989 | Michener |
| 5,394,471 A | * | 2/1995 | Ganesan et al. ............... 713/183 |
| 5,425,102 A | | 6/1995 | Moy |
| 5,588,056 A | * | 12/1996 | Ganesan ........................ 713/183 |
| 5,719,560 A | | 2/1998 | Watkins |
| 5,774,525 A | * | 6/1998 | Kanevsky et al. .......... 379/88.02 |
| 5,895,466 A | * | 4/1999 | Goldberg et al. ................. 707/5 |
| 5,944,825 A | | 8/1999 | Bellemore et al. |
| 5,991,882 A | * | 11/1999 | O'Connell ....................... 726/18 |
| 6,216,123 B1 | | 4/2001 | Robertson et al. |
| 6,285,999 B1 | | 9/2001 | Page |
| 6,401,206 B1 | * | 6/2002 | Khan et al. ..................... 713/176 |
| 6,643,784 B1 | | 11/2003 | McCulligh |
| 6,832,218 B1 | | 12/2004 | Emens et al. |
| 6,845,453 B2 | * | 1/2005 | Scheidt et al. ..................... 726/5 |
| 6,954,862 B2 | * | 10/2005 | Serpa ................................. 726/5 |
| 6,973,575 B2 | | 12/2005 | Arnold |

(Continued)

OTHER PUBLICATIONS

Bleha, S.A. et al., "Dimensionality Reduction and Feature Extraction Applications in Identifying Computer Users," Apr. 1991. IEEE Transactions, University of Missouri-Columbia. 5 pages.*

(Continued)

*Primary Examiner* — Nirav B Patel
(74) *Attorney, Agent, or Firm* — IP Spring

(57) ABSTRACT

A method and apparatus are provided for extracting information from a user's memory that will be easily recalled during future authentication yet is hard for an attacker to guess. The information might be a little-known fact of personal relevance to the user or the personal details surrounding a public event. The user is guided to appropriate topics and forms an indirect hint that is useful to the user yet not to an attacker. Information extraction techniques verify that the information is not easily attacked and to estimate how many bits of assurance the question and answer provide. The information extracted may be, e.g., Boolean (Yes/No), multiple choice, numeric, textual, or a combination of the foregoing. The enrollment process may schedule the sending of one or more reminder messages to the user containing the question (but not the answer) to reinforce the memory of the user.

23 Claims, 13 Drawing Sheets

(56) References Cited

U.S. PATENT DOCUMENTS

| | | | |
|---|---|---|---|
| 7,043,439 B2* | 5/2006 | Jost et al. | 704/275 |
| 7,043,521 B2* | 5/2006 | Eitel | 709/202 |
| 7,062,655 B2* | 6/2006 | Nelson et al. | 713/183 |
| 7,093,298 B2 | 8/2006 | Rodriquez et al. | |
| 7,106,845 B1* | 9/2006 | Zhuk et al. | 379/207.11 |
| 7,231,381 B2* | 6/2007 | Li et al. | 707/3 |
| 7,231,657 B2* | 6/2007 | Honarvar et al. | 726/2 |
| 7,234,156 B2* | 6/2007 | French et al. | 726/2 |
| 7,275,258 B2 | 9/2007 | Arbab et al. | |
| 7,299,359 B2* | 11/2007 | Hurley | 713/182 |
| 2002/0055919 A1* | 5/2002 | Mikheev | 707/3 |
| 2002/0078350 A1 | 6/2002 | Sandhu et al. | |
| 2002/0078386 A1 | 6/2002 | Bones et al. | |
| 2002/0156778 A1* | 10/2002 | Beeferman | 707/5 |
| 2003/0088554 A1* | 5/2003 | Ryan et al. | 707/3 |
| 2003/0105959 A1* | 6/2003 | Matyas et al. | 713/168 |
| 2003/0154406 A1* | 8/2003 | Honarvar et al. | 713/201 |
| 2004/0044657 A1* | 3/2004 | Lee | 707/3 |
| 2004/0078603 A1* | 4/2004 | Ogura et al. | 713/202 |
| 2004/0107406 A1* | 6/2004 | Fallman | 715/530 |
| 2004/0177272 A1 | 9/2004 | Walters | |
| 2004/0250141 A1* | 12/2004 | Casco-Arias et al. | 713/202 |
| 2005/0039056 A1* | 2/2005 | Bagga et al. | 713/202 |
| 2005/0039057 A1* | 2/2005 | Bagga et al. | 713/202 |
| 2005/0071686 A1* | 3/2005 | Bagga et al. | 713/202 |
| 2005/0076239 A1 | 4/2005 | Locke et al. | |
| 2005/0102534 A1 | 5/2005 | Wong | |
| 2005/0114678 A1* | 5/2005 | Bagga et al. | 713/183 |

OTHER PUBLICATIONS

Diffie, Whitfield and Hellman, Martin E., "Privacy and Authentication: An Introduction to Cryptography," Mar. 1979. Proceedings of the IEEE, Stanford University. 32 pages.*

P-Synch Installation and Configuration Guide May 2002 http://www.p-synch.com/docs/instguide/node42.html.*

Choosing good Passwords 2002 http://web.archive.org/web/20021225144804/http://www.itc.virginia.edu/accounts/passwords.html.*

Netscape—Passwords 1999 http://www.archive.org/web/19990930170329/http://www25.netscape.com/security/basics/passwords.html.*

Securitystats com, Password Security, downloadable from: http://web.archive.org/web/20030922081032/http://www securitystats.com/tools/password php, Sep. 2003.

Gyorfi, Thomas A., "U.S. Appl. No. 10/815,191 Advisory Action Dec. 21, 2010", , Publisher: USPTO, Published in: US.

"About Metacrawler", "http://web.archive.org/web20021126200829/www.infospace.com/info.metac/about/corporate/about.htm", , Publisher: 2002 Infospace Inc. [Verfied by the Internet Archive as of Nov. 26, 2002] (2 pages).

"P-Synch Installation and Configuration Guide Software revision: 6.2 Document revision: 0.104", "http://psynch.com/docs/instguide.pdf", May 2002, pp. 19, 20, 93, 327, 328.

"American Mathematical Society—Creating a New Account", "https://www.arms.org/amuser/help_register.html", 2001, Publisher: American Mathematical Society, Published in: US.

Granneman, Scott, "Googling Up Passwords", "http://www.securityfocus.com/columnists/224", Mar. 9, 2004, Publisher: SecurityFocus.com.

"Password Security", "http://web.archive.org/web/20030922081032/http://www.securitystats.com/tools/password.php", 2000, Publisher: SecurityStats.com Inc.

"Netscape Passwords—Choosing a Good Password", "Internet Archive http://web.archive.org/web/19990930170329/http://www25.netscape.com/security/basics/passwords.html", 1999.

"P-Synch Installation and Configuration Guide", "http://www.psynch.com/docs/instguide.pdf", May 2002.

"SecurityFocus Presentation: Online commonly used password database", "http://www.derkeiler.com/Mailing-Lists/securityfocus/pentest/2002-03/0050.html", Mar. 12, 2002.

"P-Synch White Paper", "http://web.archive.org/web/2002032116094/http://www.p-synch.com/docs/white.html", 2001, Publisher: M-Tech Inc.

Gyorfi, Thomas A., "U.S. Appl. No. 10/815,191 Office Action Dec. 24, 2008", , Publisher: USPTO, Published in: US.

Gyorfi, Thomas A., "U.S. Appl. No. 10/815,191 Office Action Jan. 23, 2008", , Publisher: USPTO, Published in: US.

Gyorfi, Thomas A., "U.S. Appl. No. 10/815,191 Office Action Mar. 18, 2010", , Publisher: USPTO, Published in: US.

Gyorfi, Thomas A., "U.S. Appl. No. 10/815,191 Office Action Apr. 25, 2007", , Publisher: USPTO, Published in: US.

Gyorfi, Thomas A., "U.S. Appl. No. 10/815,191 Office Action Apr. 8, 2009", , Publisher: USPTO, Published in: US.

Gyorfi, Thomas A., "U.S. Appl. No. 10/815,191 Office Action Jun. 3, 2008", , Publisher: USPTO, Published in: US.

Gyorfi, Thomas A., "U.S. Appl. No. 10/815,191 Office Action Aug. 17, 2007", , Publisher: USPTO, Published in: US.

Gyorfi, Thomas A., "U.S. Appl. No. 10/815,191 Office Action Sep. 10, 2009", , Publisher: USPTO, Published in: US.

Schneier, Bruce, "Applied Cryptography—Protocols, Algorithms, and Source Code in C", 1996, Publisher: John Wiley & Sons, Inc.

Gyorfi, Thomas A., "U.S. Appl. No. 10/815,191 Office Action Jul. 22, 2010", , Publisher: USPTO, Published in: US.

"Google Help", "http://web.archive.org/web/19990504113534/www.google.com/help.html", May 4, 1999.

Gyorfi, Thomas A., "U.S. Appl. No. 10/815,191 Office Action Oct. 28, 2010"Publisher: USPTO, Published in: US.

"Google Search—wicr#t1 david", "http://www.google.com/search?client=firefox-a&rls=org.mozilla%3Aen . . . ", Nov. 22, 2010.

"Google Search—w@icr#t1 David", "http://www.google.com/search?client=firefox-a&rls=org.mozilla%3Aen . . . ", Nov. 2, 2010.

"Contents", "Annals of Surgery Mar. 1954", , pp. 2-3, vol. 139, No. 3.

Cline, Mark, "WICR-88.7 FM Independent Student Indianapolis Radio Station—News", "FunCityFinder.com http://indianapolis-indiana.funcity.com/2009/04/15/wicr-887-fm-in . . . ", Nov. 2, 2010.

"Cisco 1721 and WIC-1DSU-T1-V2 configuration", "https://supportforums.cisco.com/thread/194548?tstart=0&viewcondensed", Nov. 22, 2010, Publisher: Cisco Systems Inc.

"WIC-T1 crossover?", "http://www.mail-archive.com/cisco@groupstudy.com/msg61692.html", Nov. 22, 2010.

"Google Search—pAsSwOrD David", "http://www.google.com/search?client=firefox-a&rls=org.mozilla%3Aen", Nov. 22, 2010.

"Password Protect a Directory Using .htaccess", "http://davidwalsh.name/password-protect-directory-using-htaccess", Nov. 22, 2010.

"WiseGuys Presale Password Information—We Know Presales", "http:www.tmpresale.com/2010/08/david-garrett-in-miami-fl-presale.html", Nov. 22, 2010.

Gyorfi, Thomas A., "U.S. Appl. No. 10/815,191 Office Action May 17, 2011", , Publisher: USPTO, Published in: US.

"Choosing Good Passwords U.Va Information Technology and Communication", "Http://web.archive.org/web/20021225144804/http://www.itc.virginia.edu/accounts/passwords.html", 2002.

* cited by examiner

USER DATABASE - 300

| USER NAME | PASSWORD (ANSWER) | REINFORCEMENT (HINT) |
|---|---|---|
| JOHN SMITH | 732-555-1212 | MANDY'S PHONE NUMBER |
| ⋮ | ⋮ | ⋮ |
| JON BENTLEY | PEOPLE: FATHER, MOTHER, SISTER, BROTHER<br>CAR: BLUE 1965 MUSTANG<br>TRIP: FROM HOME TO FRESNO VIA HIGHWAY | SANDY KOUFAX'S PERFECT GAME |
| JILL DOE | 12/12/68 | FIDO'S OWNER'S BIRTHDAY |

FIG. 10

Registration Completion

Secret Number: 732-555-1212 —1010
Reminder: Mandy's phone number —1020

Many people find it easier to remember their secrets if they receive periodic reminders. Please indicate below what, if any, reminders you wish to receive.

E-Mail Reminders

E-Mail Address:
user@mail.adr    1030

Frequency of Reminders
○ Weekly
⊙ Monthly
○ None

☐ Check here to receive the secret number along with the reminder.

Telephone Reminders

Telephone Number:

Frequency of Reminders
○ Weekly
○ Monthly    1040
⊙ None

Telephone reminders do not give your secret numbers.

Exit    Done

FIG. 13

Key Event Details

Please answer any questions that you remember vividly.

When You First Heard the News

Where
Where were you when you first heard about The Tragedy of September 11, 2001?
○ Home  ○ Work  ○ School  ○ Car  ○ Public Place  ○ Other
[Clear]  — 1310

Who
With whom were you with when you first heard about The Tragedy of September 11, 2001?
○ Alone  ○ Family  ○ Friends  ○ Work Associates  ○ Strangers  ○ Other
[Clear]  — 1320

How
How did you first hear about The Tragedy of September 11, 2001?
○ TV  ○ Radio  ○ Web  ○ Newspaper  ○ Phone Call  ○ Word of Mouth
[Clear]  — 1330

[Exit]

Details of Public Event     — □ ×

Please fill in (or correct) as many details as you vividly recall.

Event Name: [Sandy Koufax's Perfect Game]   — 1410

People Involved
Family members   — 1420
- [My father]
- [My mother]
- [My sister]
- [My brother]

About The Car   — 1430
Color: [Blue]  Year: [1965]  Manufacturer: [Ford]  Model: [Mustang]  Style: [Don't Recall]

From: [Home]  To: [Fresno]  Type of Road: [Highway]   — 1440

[Proceed to the Next Step]

[Exit]

Authentication Screen

Attempting authentication for JBentley. Please fill in as many empty fields as you can, then hit Submit.

1510 — Friends in the Bat Patrol from Boy Scouts.

| Hint | First Name | Last Name |
|---|---|---|
| Kirk's younger brother | xxxxxx | xxxxxxxxxx |
| Family owned the carnival | | xxxxxxxxxx |
| Pastor's son | xxxxxx | xxxxxxxxxx |
| Brother wounded in Vietnam | | |

Submit

METHOD AND APPARATUS FOR EXTRACTING AUTHENTICATION INFORMATION FROM A USER

FIELD OF THE INVENTION

The present invention relates generally to user authentication techniques and more particularly, to methods and apparatus for generating user passwords.

BACKGROUND OF THE INVENTION

A number of security issues arise when computers or other resources are accessible by humans. Most computers and computer networks incorporate computer security techniques, such as access control mechanisms, to prevent unauthorized users from accessing remote resources. Human authentication is the process of verifying the identity of a user in a computer system, often as a prerequisite to allowing access to resources in the system. A number of authentication protocols have been proposed or suggested to prevent the unauthorized access of remote resources. In one variation, each user has a password that is presumably known only to the authorized user and to the authenticating host. Before accessing the remote resource, the user must provide the appropriate password, to prove his or her authority.

Generally, a good password is easy for the user to remember, yet not easily guessed by an attacker. In order to improve the security of passwords, the number of login attempts is often limited (to prevent an attacker from guessing a password) and users are often required to change their password periodically. Some systems use simple methods such as minimum password length, prohibition of dictionary words and techniques to evaluate a user-selected password at the time the password is selected, to ensure that the password is not particularly susceptible to being guessed. As a result, users are often prevented from using passwords that are easily recalled. In addition, many systems generate random passwords that users are required to use.

In a call center environment, users are often authenticated using traditional query directed authentication techniques by asking them personal questions, such as their social security number, date of birth or mother's maiden name. The query can be thought of as a hint to "pull" a fact from a user's long term memory. As such, the answer need not be memorized. Although convenient, traditional authentication protocols based on queries are not particularly secure. For example, most authentication systems employing this approach use a limited number of questions that are static and factual. Thus, the answers can generally be anticipated and easily learned by a potential attacker. A need therefore exists for an authentication technique that provides the convenience and familiarity of traditional query directed authentication with greater security. A further need therefore exists for a method and apparatus that employs query based passwords having answers that are easy for the user to remember, yet ensures that the answers are not easily guessed by an attacker.

SUMMARY OF THE INVENTION

Generally, a method and apparatus are provided for authenticating a user using query based passwords. The disclosed query based password scheme employs attack-resistant questions having answers a user can remember, yet are not easily guessed by an attacker. The disclosed query based authentication scheme first guides a user to provide a good answer during an enrollment phase and then to provide a corresponding good question or reminder that will be used as a hint to the user during a subsequent verification phase.

During an enrollment phase, the user is guided to provide one or more answers, optionally within a selected topic area. Information extraction techniques are optionally employed during the enrollment phase to ensure that the answers cannot be qualitatively or quantitatively correlated with the user or the corresponding hint by a potential attacker. A security weight can optionally be assigned to each provided answer. Users should generally answers questions during enrollment for which the user will subsequently provide consistent answers. During a verification phase, when the user attempts to access a protected resource, the user is challenged with one or more questions that the user has previously answered. The user answers questions until a level of security for a given application is exceeded, for example, based on a sum of security weights of correctly answered questions.

A method and apparatus are provided for extracting information from a user's memory that will be easily recalled during future authentication yet is hard for an attacker to guess. The information might be a little-known fact of personal relevance to the user (such as an old telephone number) or the personal details surrounding a public event (such as the user's environment on Sep. 11, 2001) or a private event (such as an accomplishment of the user). The system guides a user to appropriate topics. The system helps the user to form an indirect hint that is useful to the user yet not to an attacker: rather than saying "My childhood phone number," the user might say "Fido's phone number," assuming that Fido was a childhood dog of the user. The system uses techniques of information extraction to verify that the information is not easily attacked and to estimate how many bits of assurance the question and answer provide. The information extracted may be, for example, Boolean (Yes/No), multiple choice, numeric, textual, or a combination of the foregoing. The enrollment process may schedule the sending of one or more reminder messages to the user containing the question (but not the answer) to reinforce the memory of the user.

A more complete understanding of the present invention, as well as further features and advantages of the present invention, will be obtained by reference to the following detailed description and drawings.

BRIEF DESCRIPTION OF THE DRAWINGS

FIG. 10 is an exemplary user interface that presents the selected answer and reminder to the user and optionally allows the user to specify whether periodic reminders should be sent;

FIG. 13 is an exemplary interface that allows a user to specify details of a particular selected event;

FIG. 14 provides an alternate interface that allows a user to specify details of a particular selected event; and FIG. 15 is an exemplary user interface that may be employed by the verification process of FIG. 5 to obtain user answers in response to a challenge.

DETAILED DESCRIPTION

Figure 1:
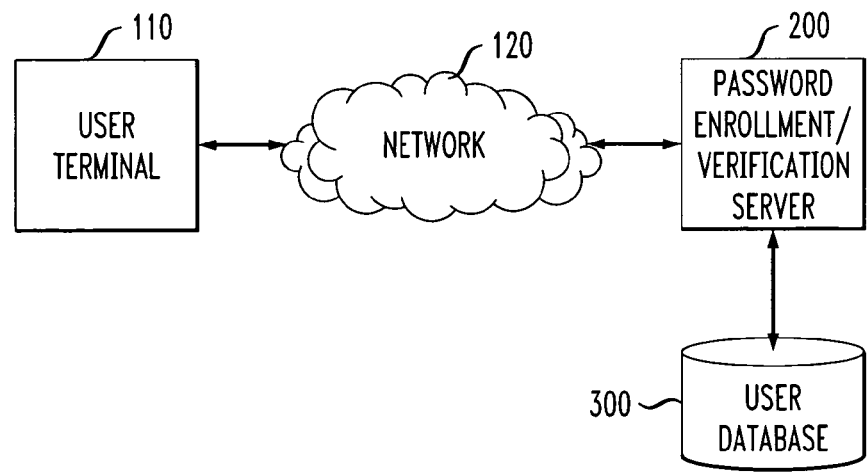
FIG. 1 illustrates a network environment in which the present invention can operate.

The present invention recognizes that authentication schemes based on queries with known—not memorized—answers are convenient and familiar. According to one aspect of the present invention, improvements are made upon traditional query directed authentication methods to provide an authentication scheme with increased security. An authentication scheme in accordance with the present invention employs query based passwords that have answers that are easy for a user to remember, yet ensure that the answers are not easily guessed by an attacker.

The query based authentication scheme of the present invention works with a user to define a question having an easily remembered answer that is not easily guessed by another person. In one implementation, a password enrollment/verification server 200, discussed further below in conjunction with FIG. 2, first guides a user to provide a good answer during an enrollment phase and then to provide a corresponding good question that will be used as a hint to the user during a subsequent verification phase. Generally, the user is guided to provide an answer within a topic area that is broad enough to apply to many users, yet narrow enough so that a given answer can be evaluated on the basis of how easily the answer may be guessed, given the question or information about the user (or both). In addition, the topics should be selected to be sufficiently private so the answers are hard to guess, yet not be so private that a user is not comfortable sharing the facts. For example, the present invention recognizes that for many users, numbers, such as telephone numbers, addresses, dates, identifying numbers or numerical facts, or textual facts, such as names of people or streets, are easy for a user to remember, yet are not easily guessed by an attacker. In addition, numbers or facts related to the personal history of the user may be easily remembered, yet not easily discovered by others.

Information extraction techniques are employed during the enrollment phase to verify the security of the questions and answers provided by the user. The information extraction techniques determine whether the provided questions and answers can be qualitatively or quantitatively correlated with the user by a potential attacker. Generally, the information extraction techniques ensure that a given answer cannot be correlated with a given user by performing an online or curriculum vitae search of any correlated material between the user and the answer. For example, if a user selects a telephone number of a person, the information extraction techniques determine if there is a predefined relationship between the owner of the telephone number and the user, such as a family member (self, sibling or parent), co-author, colleague or member of the same household. If so, this telephone number is said to be correlated with the user and is disallowed as an answer. As another example, if a user selects the jersey number of a sports figure and the information extraction techniques reveal that the user is a fan of the sports team on which the sports figure stars, then that selection would be disallowed. This correlation may be quantitatively weighted, such that if correlations within a predefined threshold are found, the answer may still be allowed, however if many correlations exceeding the predefined threshold are found, then the answer is disallowed. Such correlation information may be implemented as one or more correlation rules that are evaluated during the enrollment phase, as discussed further below in conjunction with FIG. 4.

FIG. 1 illustrates a network environment in which the present invention can operate. As shown in FIG. 1, a user employing a user device 110 attempts to access a remote protected resource over a network 120. In order to access the protected resource, such as a hardware device or bank account, the user must present an appropriate password. The user password is generated during an enrollment phase by a password enrollment/verification server 200, discussed further below in conjunction with FIG. 2. The network(s) 120 may be any combination of wired or wireless networks, such as the Internet and the Public Switched Telephone Network (PSTN). The password enrollment/verification server 200 may be associated, for example, with a call center or web server. It is noted that the present invention also applies in a stand-alone mode, for example, to control access to a given personal computer. Thus, in such an embodiment, the password enrollment/verification server 200 would be integrated with the user device 110. It is also noted that the password generation and authentication functions performed by the password enrollment/verification server 200 can be performed by two distinct computing systems.

As previously indicated, the user is guided during an enrollment phase to provide answers that are easy for the user to remember, but are not easily guessed by an attacker. In addition, during a verification phase, when the user attempts to access a resource that is protected using the present invention, the password enrollment/verification server 200 challenges the user with one or more questions that the user has previously answered, as recorded in a user database 300, discussed further below in conjunction with FIG. 3.

Figure 2:
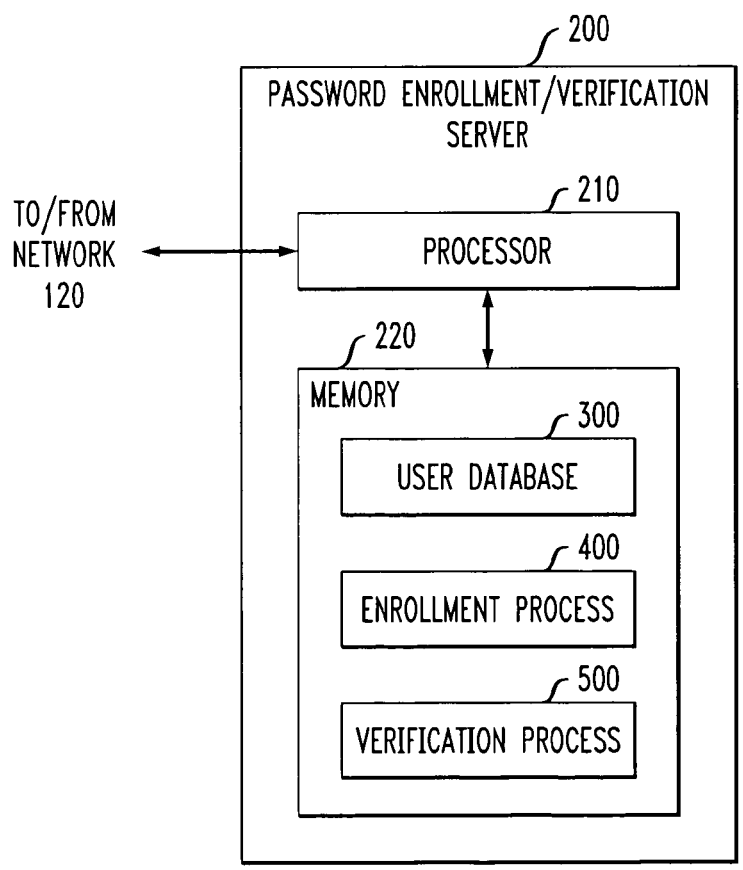
FIG. 2 is a schematic block diagram illustrating the password enrollment/verification server of FIG. 1 in further detail.

FIG. 2 is a schematic block diagram of an exemplary password enrollment/verification server 200 incorporating features of the present invention. The password enrollment/verification server 200 may be any computing device, such as a personal computer, work station or server. As shown in FIG. 2, the exemplary password enrollment/verification server 200 includes a processor 210 and a memory 220, in addition to other conventional elements (not shown). The processor 210 operates in conjunction with the memory 220 to execute one or more software programs. Such programs may be stored in memory 220 or another storage device accessible to the password enrollment/verification server 200 and executed by the processor 210 in a conventional manner.

For example, as discussed below in conjunction with FIGS. 3 through 5, the memory 220 may store a user database 300, an enrollment process 400 and a verification process 500. Generally, the user database 300 records the password that was generated for each enrolled user. The enrollment process 400 guides the user to provide one or more answers and ensures that the answers are not correlated with the user. The verification process 500 employs a query directed password protocol incorporating features of the present invention to authenticate a user.

Figures 3, 4:
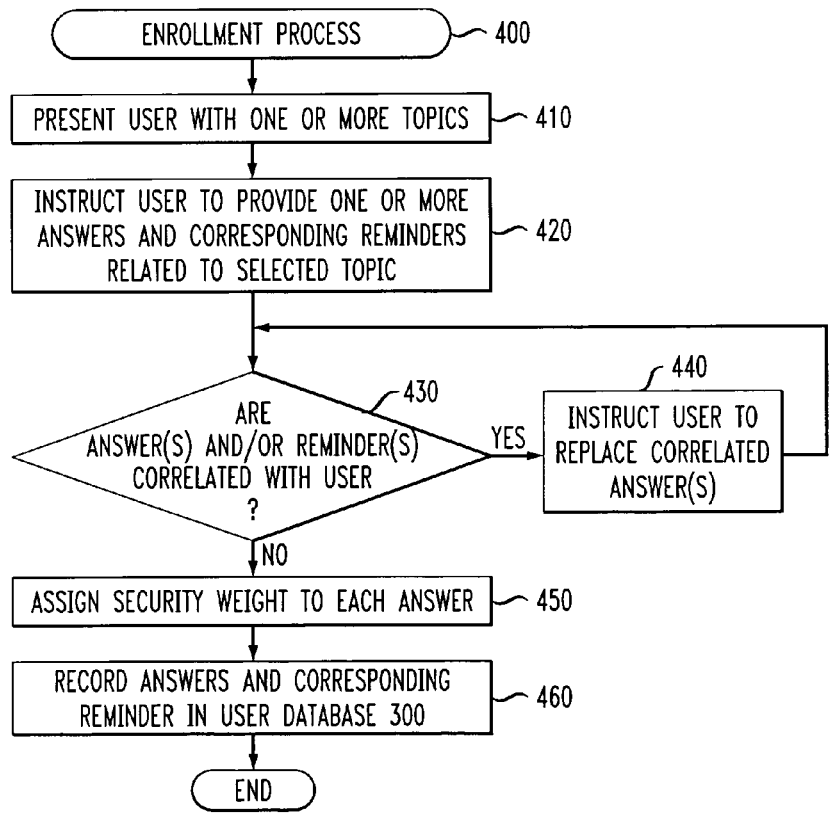
FIG. 3 is a sample table from an exemplary user database of FIGS. 1 and 2.
FIG. 4 is a flow chart describing an exemplary implementation of an enrollment process of FIG. 2 incorporating features of the present invention.

FIG. 3 is a sample table from an exemplary user database 300 of FIGS. 1 and 2. The user database 300 records the query based password for each enrolled user. As shown in FIG. 3, the user database 300 consists of a plurality of records, such as records 305-320, each associated with a different enrolled user. For each enrolled user, the user database 300 identifies the user in field 330, as well as the password (answer) in field 340 and optionally provides an associated reinforcement (hint) in field 350. For example, the user indicated in record 305 may have provided the following telephone number as an answer 732-555-1212, and the corresponding hint "Mandy's Phone Number," where Mandy may be, for example, a pet or a child, but not the person who is identified with the telephone number in a directory. Generally, the user will be allowed to user the selected telephone number as a password, provided that the information extraction analysis does not determine that the answer is correlated with the user, as discussed below in conjunction with FIG. 4.

FIG. 4 is a flow chart describing an exemplary implementation of an enrollment process 400 of FIG. 2 incorporating features of the present invention. As previously indicated, the exemplary enrollment process 400 guides the user to provide one or more answers and ensures that the answers are not correlated with the user. As shown in FIG. 4, a user is initially presented with one or more topics (and optionally sub-topics) for selection during step 410. As previously indicated, the user can be guided to provide an answer within a topic area that is broad enough to apply to many users, yet narrow enough so that a given answer can be evaluated on the basis of how easily the answer may be guessed, given the question or information about the user (or both). In addition, the topics should be selected to be sufficiently private so the answers are hard to guess, yet not be so private that a user is not comfortable sharing the facts. The user is instructed during step 420 to provide one or more answers and associated reminders that are related to the selected topic.

A test is performed during step 430 to determine if the answers or reminders (or both) are correlated with the user. In one implementation, one or more correlation rules may be defined to ensure that a given answer is not correlated with the user. For example, if a user selects a telephone number of a person, the information extraction analysis performed during step 430 can determine if there is a predefined relationship between the owner of the telephone number and the user, such as a family member (self, sibling or parent), co-author, colleague or member of the same household (qualitative correlation rule). The analysis correlates the number to the person by analyzing the number of hits obtained by using a search engine (such as Google.com) where both the person and number appear on the same page. If the number of hits is higher than a chosen threshold, then a positive correlation is said to exist. Alternatively, the information extraction analysis may also use specialized web databases such as www.anywho.com that allow retrieval of information associated with a particular telephone number. The metric in this case is a positive match between the user's answer and the match against the phone entry.

If it is determined during step 430 that at least one answer or reminder (or both) can be correlated with the user, then these answers are discarded during step 440 and the user is requested to select additional answers. If, however, it is determined during step 430 that the answers or reminders (or both) cannot be correlated with the user, then a weight is assigned to each selected question during step 450 to estimate the level of difficulty an attacker would have to answer the question correctly. Generally, the weights are inversely related to the probability of an answer being chosen by a wide population of users. For instance, consider a multiple choice question regarding favorite foods, with the following possible answers: 1) steak, 2) liver, 3) ice cream, 4) corn, 4) chicken, 6) rutabaga. Let us say that in a sampling of the population, people chose these answers in the following respective proportions: 1) 30%, 2) 3%, 3) 40%, 4) 10%, 4) 14%, 6) 2%. Because ice cream and steak could be guessed by an attacker as more likely than liver and rutabaga to be the answer of a user, the system gives less weight to these more popular answers. One way to weight these answers is by the inverse of the probability, so the weights here would be: 1) 3.33, 2) 33.3, 3) 2.4, 4) 10, 4) 6.6, 6) 40.

The selected questions, and corresponding weights and answers are recorded in the user database 300 during step 460 before program control terminates.

Figure 5:
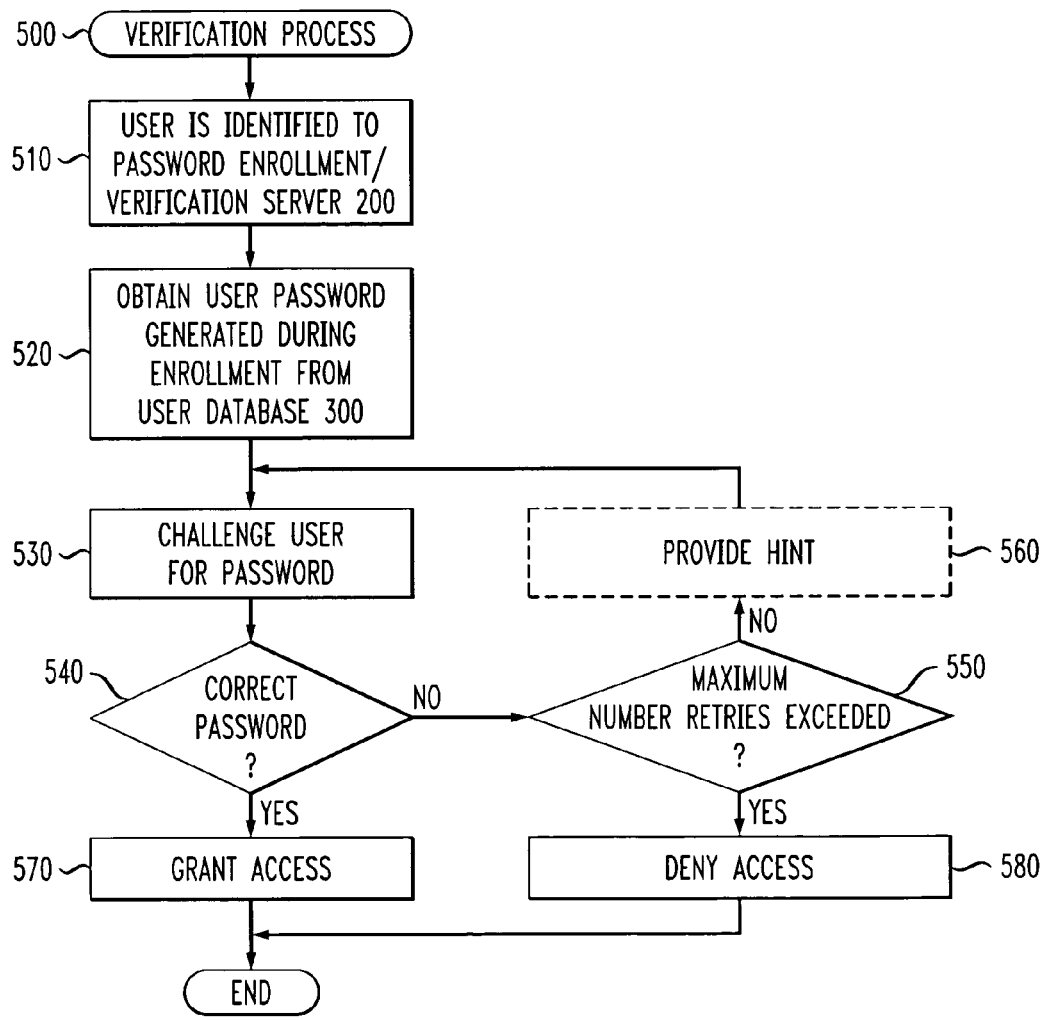
FIG. 5 is a flow chart describing an exemplary implementation of a verification process of FIG. 2 incorporating features of the present invention.

FIG. 5 is a flow chart describing an exemplary implementation of the verification process 500 of FIG. 2 incorporating features of the present invention. As previously indicated, the verification process 500 employs a query directed password protocol incorporating features of the present invention to authenticate a user. As shown in FIG. 5, the user initially identifies himself (or herself) to the password enrollment/verification server 200 during step 510. During step 520, the verification process 500 obtains the user password that was generated for this user during the enrollment phase from the user database 200. The user is challenged for the password during step 530. The challenge may optionally include the hint associated with the password.

A test is performed during step 540 to determine if the password provided by the user matches the password obtained from the user database 200. If it is determined during step 540 that the passwords do not match, then a further test is performed during step 550 to determine if the maximum number of retry attempts has been exceeded. If it is determined during step 550 that the maximum number of retry attempts has not been exceeded, then the user can optionally be presented with a hint during step 560 before again being challenged for the password. If it was determined during step 550 that the maximum number of retry attempts has been exceeded, then the user is denied access during step 580.

If, however, it was determined during step 540 that the password provided by the user matches the password obtained from the user database 200, then the user is provided with access during step 570.

Provision of Answers Related to a Selected Topic

Figure 6:
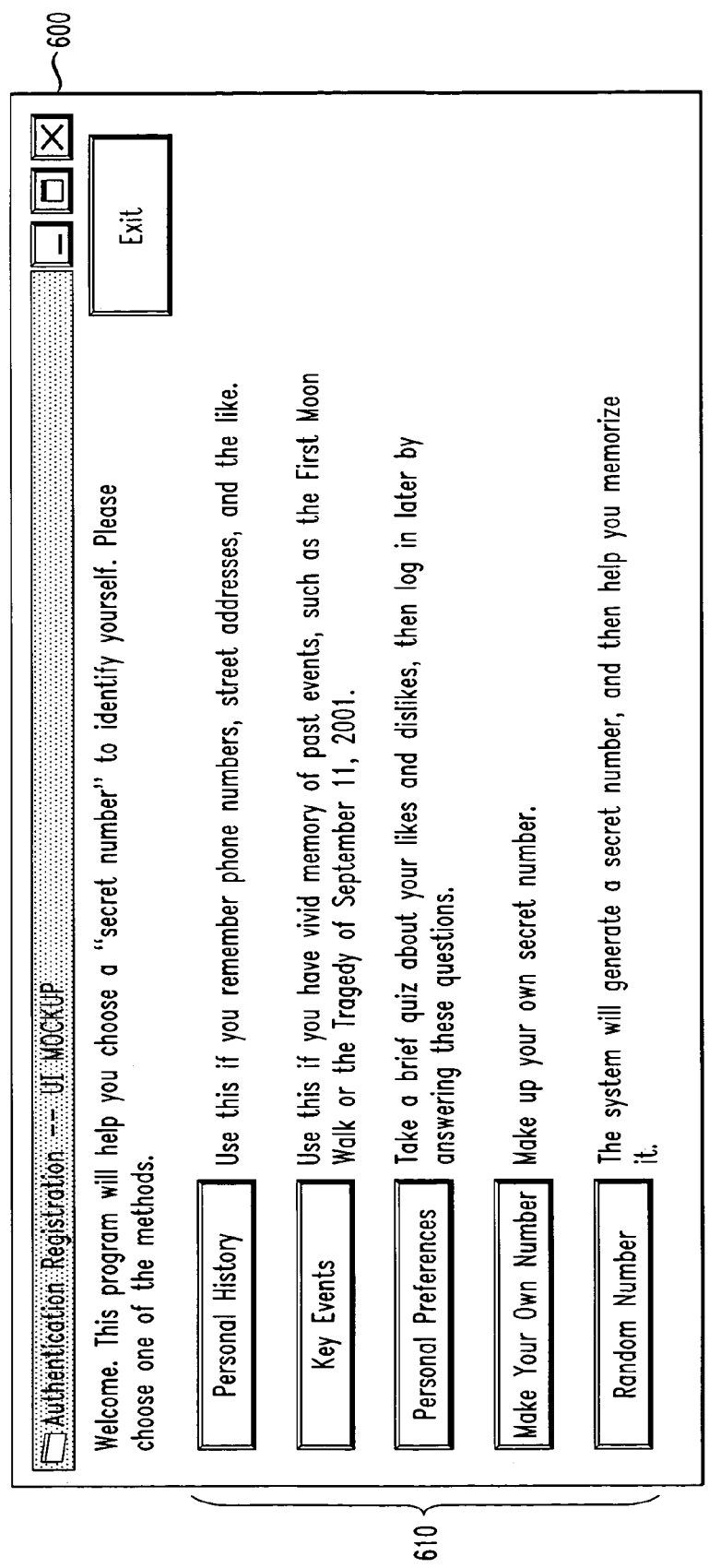
FIG. 6 is an exemplary user interface that presents a user with a set of topics from which the user can select a given topic for which the user will provide one or more answers.

FIG. 6 is an exemplary user interface 600 that presents a user with a set of topics 610 (during step 410 of the enrollment process 400) from which the user can select a given topic for which the user will provide one or more answers. For example, the exemplary user interface 600 allows a user to select topics related to personal history, discussed below in conjunction with FIGS. 7 through 10, key events, discussed below in conjunction with FIGS. 11 through 15, personal preferences, make your own number, or a random number.

Figure 7:
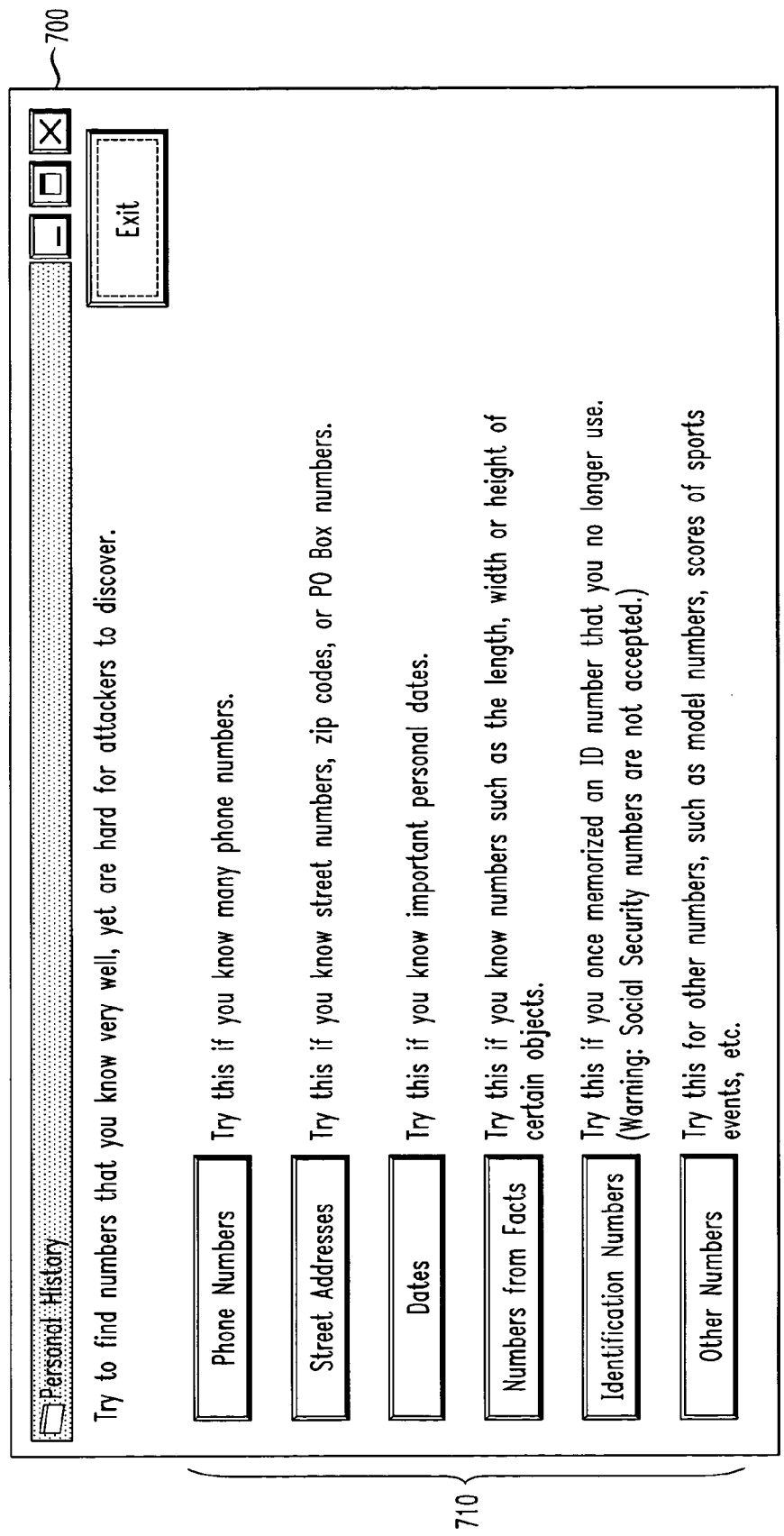
FIG. 7 is an exemplary user interface that presents the user with a set of sub-topics from which the user can select a given topic for which the user will provide one or more answers.

In an exemplary implementation, if a user selects the first topic (personal history) from the set of topics 610, then the user will be presented with the user interface 700, shown in FIG. 7. FIG. 7 is an exemplary user interface 700 that presents the user with a set of sub-topics 710 from which the user can select a given topic for which the user will provide one or more answers. As shown in FIG. 7, the exemplary interface 700 allows a user to provide answers that are related to telephone numbers, street addresses, dates, numbers from facts, identifying numbers, or other numbers.

Figure 8:
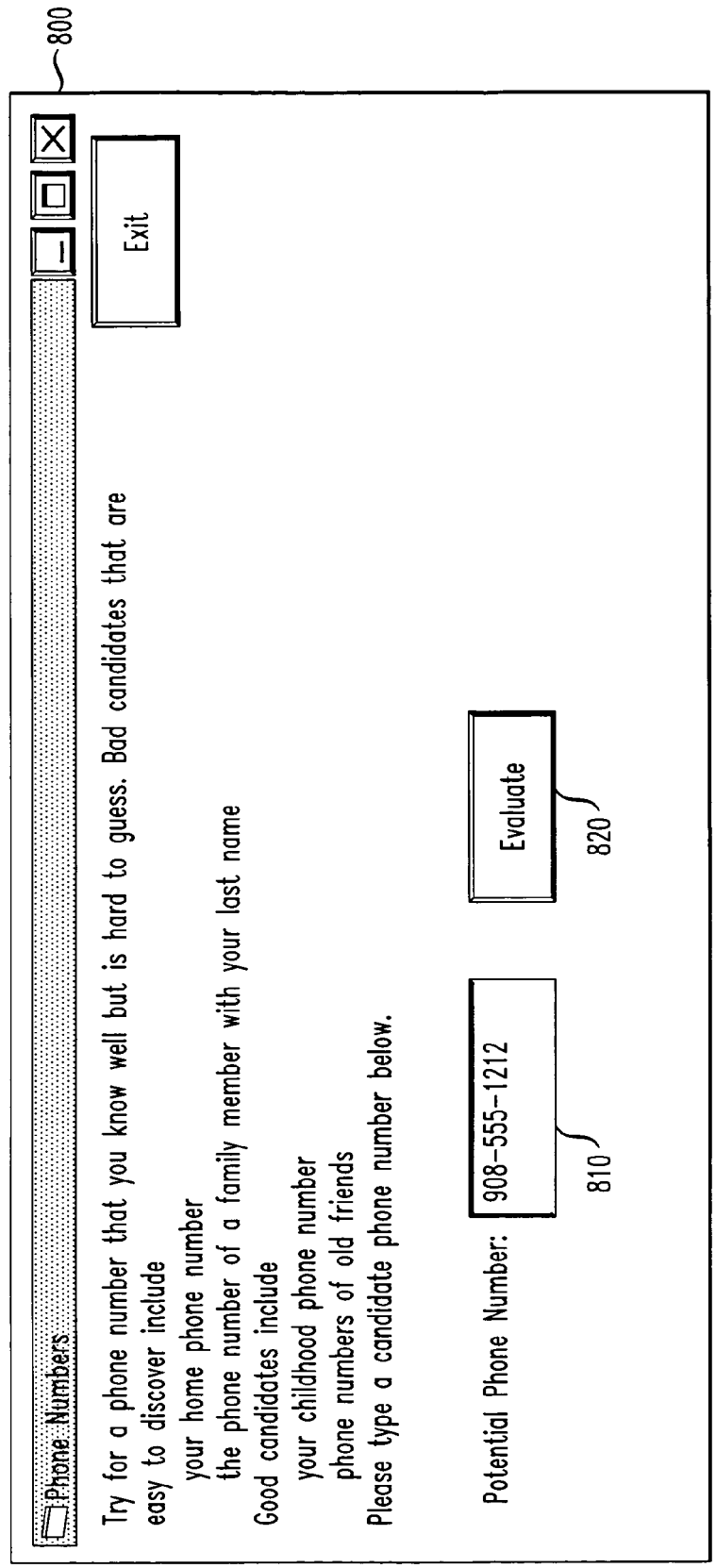
FIG. 8 is an exemplary user interface that allows a user to enter a proposed answer for evaluation.

In an exemplary implementation, if a user selects the first subtopic (telephone numbers) from the set of sub-topics 710, then the user will be presented with the user interface 800, shown in FIG. 8. FIG. 8 is an exemplary user interface 800 that allows a user to enter a proposed answer for evaluation in a field 810 and hit a button 820 to have the answer evaluated. The interface 800 may optionally provide a user with guidelines or suggestions for good or bad answers. For example, the interface 800 may indicate that some bad choices include the telephone number of the user or another family member. Thus, a user can enter a candidate answer and receive feedback about whether the candidate answer is correlated with the user. For example, a reverse telephone look-up can be performed to determine if the telephone number is associated with the user or another person having one or more defined relations to the user, such as a family member or colleague. In addition, frequently used telephone numbers, such as those associated with large corporations or institutions, such as United Air Lines or the White House, can also be flagged as problematic.

Figure 9:
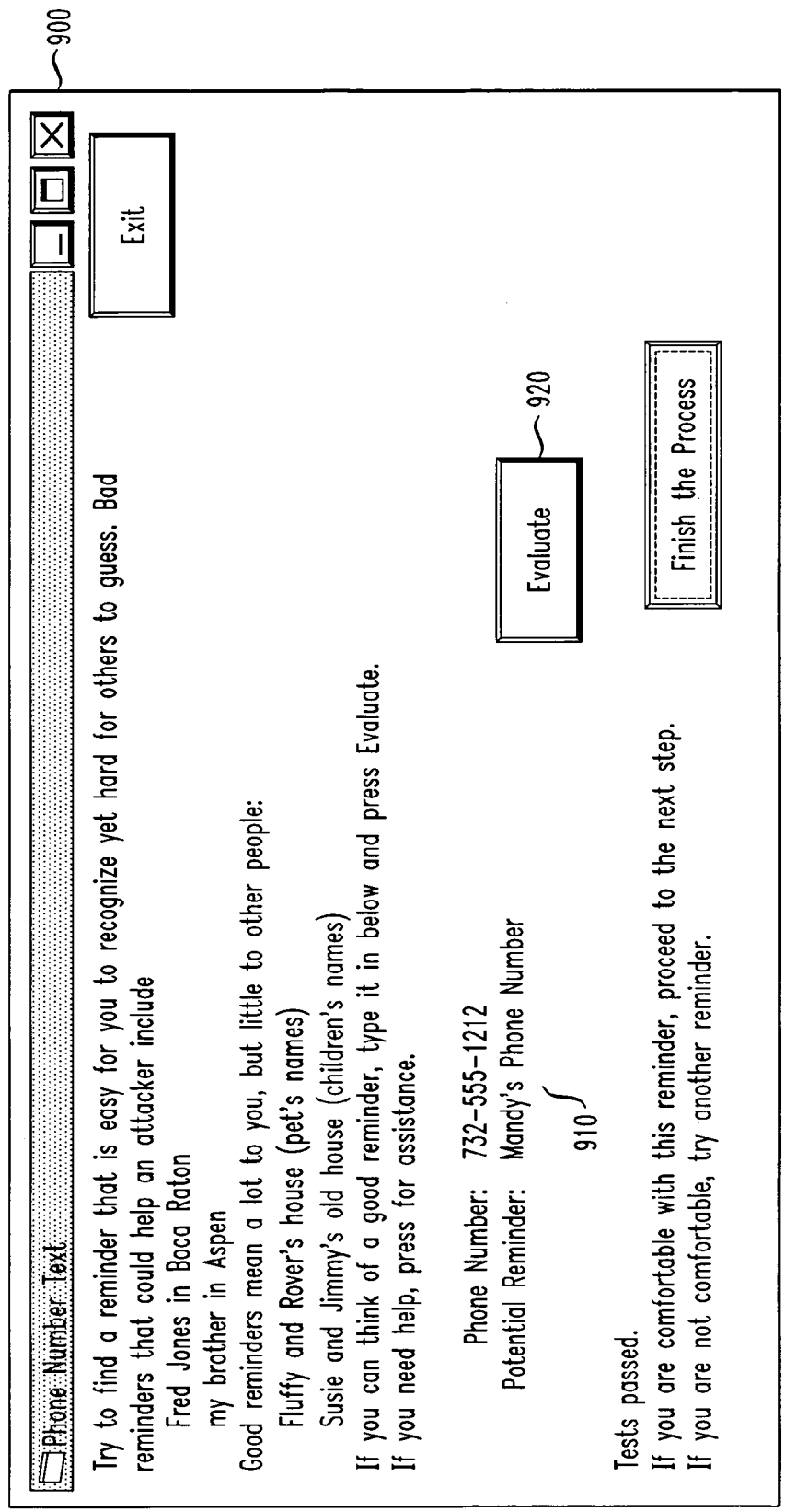
FIG. 9 is an exemplary user interface that allows a user to enter a proposed reminder or hint associated with a particular answer for evaluation.

FIG. 9 is an exemplary user interface 900 that allows a user to enter a proposed reminder or hint associated with a particular answer in a field 910 and hit a button 920 to have the reminder evaluated. Just like a proposed answer, a proposed reminder can be evaluated using information extraction techniques. The interface 900 may optionally provide a user with guidelines or suggestions for good or bad reminders. For example, the interface 900 may indicate that some bad choices include the name and address of a particular person (whether identified explicitly by name or by a unique label that can be resolved by an attacker, such as "my mother"). Thus, a user can enter a candidate reminder and receive feedback about whether the candidate reminder is correlated with the user or the answer. For example, a search can be performed in a telephone directory to obtain the telephone number or address (or both) of a person identified in the proposed reminder to determine if the identified person is correlated with the user or the answer.

FIG. 10 is an exemplary user interface 1000 that presents the selected answer and reminder to the user and optionally allows the user to specify, for example, upon completion of an enrollment, whether reminders should be sent. The exemplary interface 1000 presents the user with an answer in a field 1010 and the corresponding reminder in a field 1020. The user can optionally specify whether any reminders should be sent by electronic mail or telephone, and the frequency of such reminders, using fields 1030, 1040, respectively.

Passwords Based on Memorable Events

As previously indicated, FIGS. 11 through 15 allow a user to specify answers and reminders that are related to the topic of "key events." The present invention recognizes that a query based authentication scheme can employ psychological insights to derive questions having answers that are easily recalled by the user, yet not easily guessed by an attacker. For example, it has been found that many people have very strong "flashbulb memories" of key public events that occurred in their lives, such as the events of Sep. 11, 2001 (97% of Americans who are old enough to remember actually do remember where or what they were doing one year later— Pew Research); the assassination of President Kennedy (strongly recalled by 90% of Americans who are old enough to remember) or the events related to the explosion of the space shuttle Challenger (82%). In addition, may people have strong recollections of private events as well, that could form the basis of query based passwords. Private events may include, for example, attained goals or first experiences. For example, if a private event was "learning to drive," the user may be asked to provide details on parallel parking or learning to drive a manual transmission. The user can specify certain details of the private event or accomplishment that can later be queried during a verification phase. A user can indicate, for example, that he or she learned to drive shift gears at a parking lot at Veteran's Stadium (where) with his or her father (with who), in a blue 1965 Ford Mustang (what). In addition, the user may optionally specify a key phrase associated with the event, such as "My head jerked three times just out of habit."

For a given event, a user may be asked to specify, for example, when, where and how he or she first heard of the event or when, where and how he or she reacted as the events unfolded. It is noted that while such memories are frequently vivid, they may not be accurate. Nonetheless, the query based authentication scheme of the present invention relies on consistency, not accuracy, for the authentication of a user.

Figure 11:
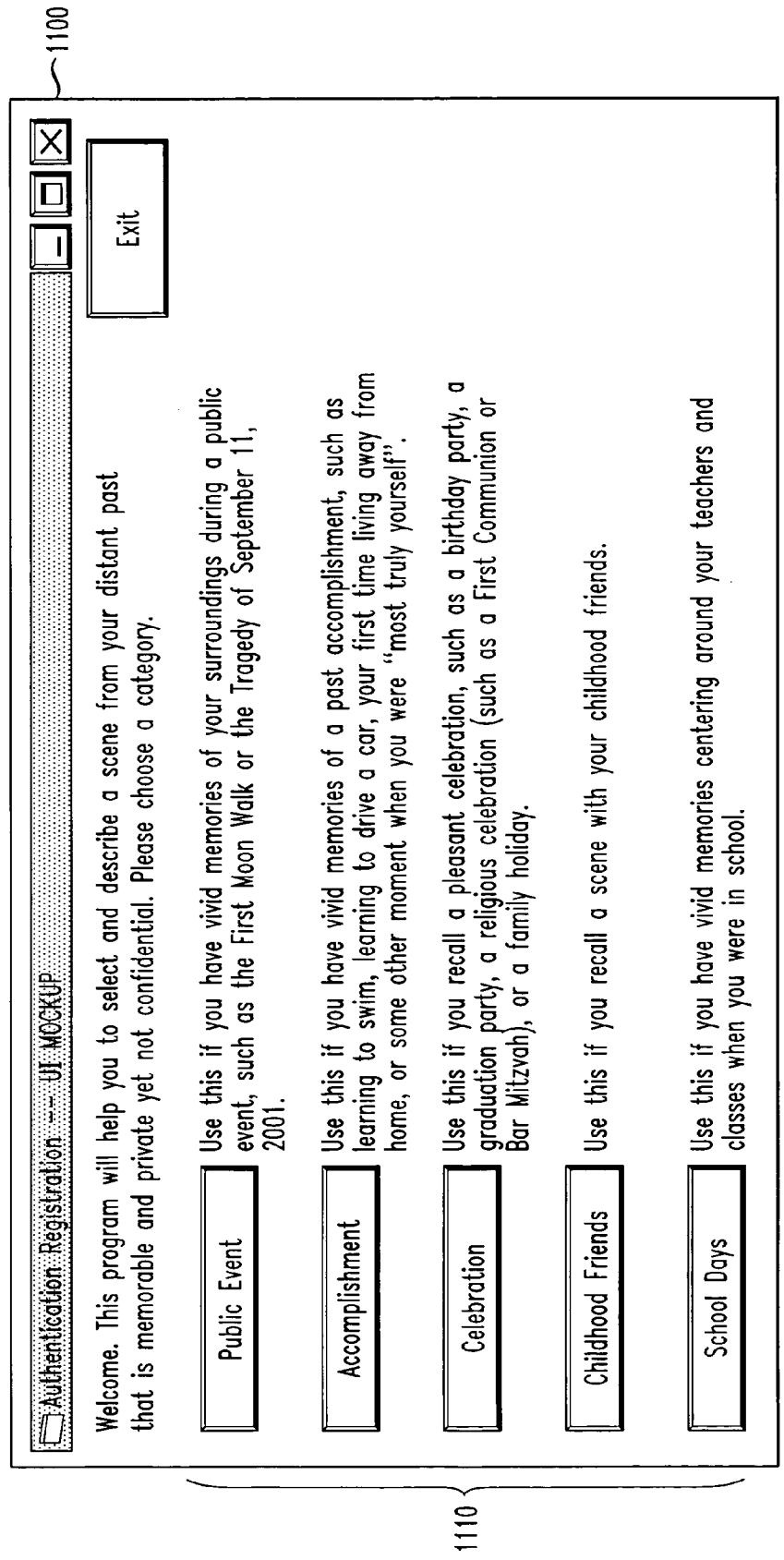
FIG. 11 is an exemplary user interface that presents a user with a set of event categories and allows a user to specify a particular category of events.

FIG. 11 is an exemplary user interface 1100 that presents a user with a set of event categories and allows a user to specify a particular category of events, such as public event, personal accomplishment, celebration, childhood friends, or school days. The user selects an event category, for example, by clicking on the associated button. Once a user selects a desired event category, the user is presented with one or more additional windows that allow the user to specify certain details about the event that are recalled by the user. The specified details may later be used to query the user during a verification phase of the present invention.

Figure 12:
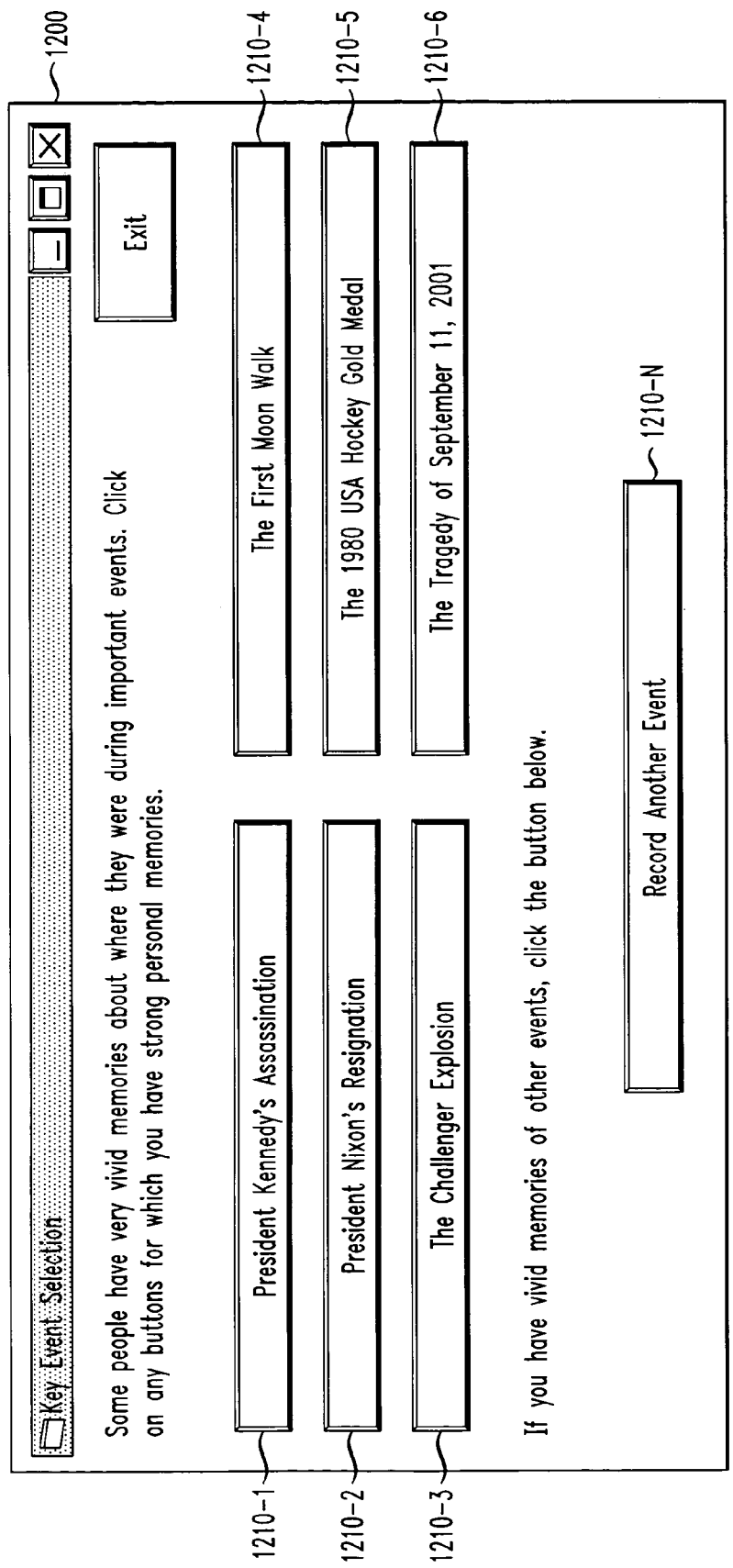
FIG. 12 is a user interface associated with a public event category that presents the user with a set of public events from which the user selects a given public event for which the user will specify details.

FIG. 12 is an exemplary user interface 1200 associated with the public event category. The user interface 1200 presents the user with a set of public events 1210-1 through 1210-N from which the user selects a given public event for which the user will specify details.

Assuming that the user selected the public event 1210-6 associated with the events of Sep. 11, 2001, the user will be presented with the interface 1300 shown in FIG. 13 (or with similar interfaces for specifying similar details of other events). FIG. 13 is an exemplary interface 1300 that allows a user to specify details of a particular selected event, such as the events of Sep. 11, 2001. As shown in FIG. 13, the exemplary interface 1300 provides three sections 1310, 1320, 1330 to allow the user to specify details about where the user first heard of the news, with who and how the user first heard of the news, in a multiple choice format.

FIG. 14 provides an alternate interface 1400 that allows a user to specify details of a particular selected event, such as a perfect baseball game pitched by Sandy Koufax. While the exemplary interface 1400 relies on the fact that many people happen to remember details about a car that may be associated with an event, many alternate interfaces can be developed to capture details of food, people, places, phrases or other aspects of an event, as would be apparent to a person of ordinary skill.

The exemplary interface 1400 provides a field 1410 allows a user to identify a particular selected event, such as a perfect baseball game pitched by Sandy Koufax. In addition, the exemplary interface 1400 provides fields 1420, 1430, 1430 that allow the user to specify details of the people, car and trip associated with the event, respectively. The user populates each field with the appropriate details, as desired, in a known manner.

In this manner, the user is not limited only to multiple choice answers, like the interface 1300, but does not have the complete flexibility of free-form text which can be hard to recall or analyze.

FIG. 15 is an exemplary user interface 1500 that may be employed by the verification process 500 to obtain user answers in response to a challenge. Assuming that the user identified one or more friends, with their names and corresponding clues, during an authentication phase, the exemplary user interface 1500 presents the user with a hint 1510 as well as one or more queries 1520 based on the provided clues that the user must complete during verification in order to obtain access. As shown in FIG. 15, one or more of the response fields 1530 associated the queries 1520 may optionally be filled in with asterisks ("***") indicating a "don't care" condition (i.e., that the user does not need to fill in these fields). In this manner, the user is queried about a subset of the originally provided data, making the verification faster and easier for the user, and preserving bits of assurance for subsequent verifications.

System and Article of Manufacture Details

As is known in the art, the methods and apparatus discussed herein may be distributed as an article of manufacture that itself comprises a computer readable medium having computer readable code means embodied thereon. The computer readable program code means is operable, in conjunction with a computer system, to carry out all or some of the steps to perform the methods or create the apparatuses discussed herein. The computer readable medium may be a recordable medium (e.g., floppy disks, hard drives, compact disks, or memory cards) or may be a transmission medium (e.g., a network comprising fiber-optics, the world-wide web, cables, or a wireless channel using time-division multiple access, code-division multiple access, or other radio-frequency channel). Any medium known or developed that can store information suitable for use with a computer system may be used. The computer-readable code means is any mechanism for allowing a computer to read instructions and data, such as magnetic variations on a magnetic media or height variations on the surface of a compact disk.

The computer systems and servers described herein each contain a memory that will configure associated processors to implement the methods, steps, and functions disclosed herein. The memories could be distributed or local and the processors could be distributed or singular. The memories could be implemented as an electrical, magnetic or optical memory, or any combination of these or other types of storage devices. Moreover, the term "memory" should be construed broadly enough to encompass any information able to be read from or written to an address in the addressable space accessed by an associated processor. With this definition, information on a network is still within a memory because the associated processor can retrieve the information from the network.

It is to be understood that the embodiments and variations shown and described herein are merely illustrative of the principles of this invention and that various modifications may be implemented by those skilled in the art without departing from the scope and spirit of the invention.

We claim:

1. A method for generating a password for a user during an enrollment phase, comprising:
presenting said user with a plurality of topics;
receiving a user selection of at least one topic;
receiving one or more personal details from said user associated with said at least one selected topic as a proposed password;
performing an Internet search using a query containing one or more keywords derived from said personal details of said proposed password, wherein said Internet search searches contents of the Internet across a plurality of web sites using a search engine tool;
evaluating results of said search relative to one or more predefined thresholds applicable to said at least one selected topic;
rejecting said proposed password when said user is correlated with said proposed password if one or more of said predefined thresholds are exceeded by said results; and
recording said one or more personal details as a password for said user if said proposed password is not rejected.

2. The method of claim 1, further comprising the step of receiving a reminder associated with each of said one or more personal details.

3. The method of claim 1, wherein said rejecting step employs correlation rules that are based on said at least one topic.

4. The method of claim 1, wherein said rejecting step employs one or more predefined correlation rules that ensure that answers to user selected questions cannot be qualitatively correlated with said user.

5. The method of claim 1, wherein said rejecting step employs one or more predefined correlation rules that ensure that answers to user selected questions cannot be quantitatively correlated with said user.

6. The method of claim 1, further comprising the step of sending said one or more personal details to said user as a reinforcement of said password.

7. The method of claim 1, wherein said one or more personal details are related to a personal fact from a past of said user.

8. The method of claim 1, wherein said one or more personal details are related to an experience of said user in connection with a public event.

9. The method of claim 1, wherein said one or more personal details are related to an experience of said user in connection with a private event.

10. The method of claim 1, wherein said one or more personal details can be tested during a verification phase using one or more of Boolean, multiple choice, numeric or textual queries.

11. The method of claim 1, wherein said at least one topic is selected based on psychological insights.

12. An apparatus for generating a password for a user during an enrollment phase, comprising:
a memory; and
at least one processor, coupled to the memory, operative to:
present said user with a plurality of topics;
receive a user selection of at least one topic;
receive one or more personal details from said user associated with said at least one selected topic as a proposed password;
perform an Internet search using a query containing one or more keywords derived from said personal details of said proposed password, wherein said Internet search searches contents of the Internet across a plurality of web sites using a search engine tool;
evaluate results of said search relative to one or more predefined thresholds applicable to said at least one selected topic;
reject said proposed password when said user is correlated with said proposed password if one or more of said predefined thresholds are exceeded by said results; and
recording said one or more personal details as a password for said user if said proposed password is not rejected.

13. The apparatus of claim 12, wherein said processor is further configured to receive a reminder associated with each of said one or more personal details.

14. The apparatus of claim 12, wherein said rejecting step employs correlation rules that are based on said at least one topic.

15. The apparatus of claim 12, wherein said rejecting step employs one or more predefined correlation rules that ensure that answers to user selected questions cannot be qualitatively correlated with said user.

16. The apparatus of claim 12, wherein said rejecting step employs one or more predefined correlation rules that ensure that answers to user selected questions cannot be quantitatively correlated with said user.

17. The apparatus of claim 12, wherein said processor is further configured to send said one or more personal details to said user as a reinforcement of said password.

18. The apparatus of claim 12, wherein said one or more personal details are related to a personal fact from a past of said user.

19. The apparatus of claim 12, wherein said one or more personal details are related to an experience of said user in connection with a public event.

20. The apparatus of claim 12, wherein said one or more personal details are related to an experience of said user in connection with a private event.

21. The apparatus of claim 12, wherein said one or more personal details can be tested during a verification phase using one or more of Boolean, multiple choice, numeric or textual queries.

22. The apparatus of claim 12, wherein said at least one topic is selected based on psychological insights.

23. An article of manufacture for generating a password for a user during an enrollment phase, comprising a machine readable storage medium containing one or more programs which when executed implement the steps of:

presenting said user with a plurality of topics;

receiving a user selection of at least one topic;

receiving one or more personal details from said user associated with said at least one selected topic as a proposed password;

performing an Internet search using a query containing one or more keywords derived from said personal details of said proposed password, wherein said Internet search searches contents of the Internet across a plurality of web sites using a search engine tool;

evaluating results of said search relative to one or more predefined thresholds applicable to said at least one selected topic;

rejecting said proposed password when said user is correlated with said proposed password if one or more of said predefined thresholds are exceeded by said results; and recording said one or more personal details as a password for said user if said proposed password is not rejected.

\* \* \* \* \*